MAGNETIC TRANSFER CIRCUITS

Filed Dec. 3, 1954

INVENTORS
ALBERT J. MEYERHOFF
JOHN O. PAIVINEN
BY
Laurence R. Brown
ATTORNEY 2,952,007

MAGNETIC TRANSFER CIRCUITS

Albert J. Meyerhoff, Wynnewood, and John O. Paivinen, Berwyn, Pa., assignors to Burroughs Corporation, Detroit, Mich., a corporation of Michigan Filed Dec. 3, 1954, Ser. No. 472,906

3 Claims. (Cl. 340—174)

This invention relates to bistable magnetic storage elements and more particularly to circuits for transferring information from one magnetic storage element to another.

Static magnetic storage elements are well known in the art. In general, a magnetic core material having a substantially rectangular hysteresis characteristic is used to obtain good signal to noise ratios in magnetic storage elements. However, certain circuits have been developed for enabling materials having hysteresis characteristics substantially departing from rectangular to be employed, by reducing the effect of noise generated due to the non-rectangularity. Some such circuits in the prior art have required a further matched binary state magnetic element which is connected in such a manner that a pair of equal and opposite non-rectangular characteristics are generated to cancel each other during the switching operation. These circuits require matched components and thus are inefficient in operation and expensive. Other circuits have required the use of current which is derived from a circuit external to the transfer circuits coupled between a pair of magnetic elements to produce inhibiting signals. Such circuits are inefficient since they cause loss of transfer of signals as well as noise.

A small amount of noise transfer tends to build up when circuits requiring multiple readout are utilized. Therefore the number of times stored information may be read out is limited. Also the noise appears to limit the number of elements which may be coupled in cascade circuits for reliable operation.

It is, therefore, an object of the present invention to produce improved circuits for reducing noise transfer between coupled bistable magnetic elements.

It is a general object of the invention to produce reliable noise-free transfer of information in magnetic shift register circuits, or the like.

It is accordingly an object of the invention to provide efficient and simplified circuits for transferring information along large numbers of interconnected bistable magnetic elements with better signal to noise ratios than heretofore possible.

It is a further object of the invention to provide magnetic transfer circuits such that multiple readout techniques may be employed.

Therefore, in accordance with the invention a transfer circuit is connected between two magnetic elements such that a large transfer of information is coupled from a transferror element to a transferee element through the transfer circuit in response to a resident storage of one state in the transferror element. In such a transfer circuit a small amount of unwanted information or noise is coupled through the transfer circuit in response to the resident storage of the opposite state in the transferror element. Therefore, there is provided by the present invention a monostable state reactive element positioned in the transfer circuit to produce a signal in opposition to the transfer of noise. This reactive element in one embodiment comprises a nonsaturable air core inductor serially connected in the transfer circuit. This inductor, by means of current flowing in the transfer circuit, produces an opposition voltage to the transfer of noise between two coupled magnetic elements without passing current from a source external to the transfer loop through the inductor. Because of the reactance, the inductor opposes the signal transfer mainly at the initial current surge to thereby oppose only the noise transfer and not materially inhibit the information transfer which occurs over a relatively large period of time.

Further objects and advantages of the invention will be found throughout the following more detailed description of the invention and its organization, particularly when considered in connection with the accompanying drawing, in which.

Figure 1:
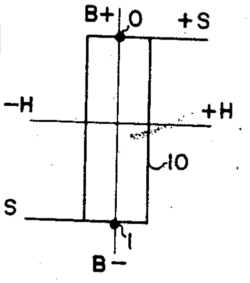
Fig. 1 is a graph illustrating an ideal hysteresis characteristic for bistable state magnetic storage elements.
Figure 2:
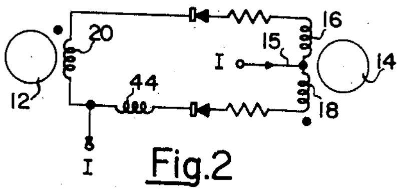
Fig. 2 is a circuit for conditionally transferring information from one magnetic element to another with little noise in accordance with the invention.

Referring now simultaneously to Figs. 1 and 2, the hysteresis curve 10 is an ideal curve representing the properties of core materials used in the storage elements 12 and 14. With core materials having rectangular hysteresis characteristic, a resident remanence state of "0" or "1" may exist. If the field H is changed in the magnetic core by means of current flowing through a winding thereabout enough to drive the core into saturation, the magnetic material will be caused to undergo a change of state with the proper field polarity. Thus, if the core is in a resident "1" state, and the field is changed in the +H direction with enough amplitude to drive the core into magentic saturation +S in the +B direction, the core will return to the remanence state "0" after the magnetizing field is removed. The state "0" results from the +S saturation whether the core was initially in the remanence condition "1" or "0."

When the hysteresis loop is substantially rectangular, there is very little change of induction B with a change in field H if the core resides in the "0" state and is driven to the "0" (+S) state of saturation. Thus, the rate of change of induction is substantially zero and the core is normally non-inductive. Conversely, when the core switches from the "1" remanence state to the opposite saturation condition (+S), the rate of change of induction is substantially infinite, and therefore the storage element acts substantially as a purely resistive device. During the switching period, however, since the rate of change of inductance is substantially infinite, a large signal voltage is produced which may be used to change the storage state of a further element and therefore transfer stored information from one element to another.

A transfer circuit is shown in Fig. 2 for coupling storage element 12 to storage element 14. In this transfer circuit, a source of current I is passed through the transfer loop in order to enable a transfer of information from element 12 to element 14. Thus, current is passed through two separate windings 16 and 18 on the transferror element 14 to produce equal and opposite flux in the absence of a signal transfer which will unbalance the current flow. If the residence storage state of element 12 is, for example, "0" such that current flow through the winding 20 tends to establish the saturation condition +S corresponding to the residence storage state, the current will not be substantially unbalanced through the windings 16 and 18, and the storage state of element 14 remains unchanged due to the current flow I. However, since the winding 20 is connected in only one current branch through the upper winding 16, if the element 12 is in state "1" and thus is caused to switch because of the current I passing through winding 20, it causes an unbalance of current flow in the separate windings 16 and 18 of element 14 and therefore causes that element to be driven into magnetic saturation —S, thereby switching the element into a "1" storage state if it resides in a "0" storage state. Thus, a transfer of information is effected from element 12 to element 14.

In the transfer circuit of Fig. 2, the direction of current flow is indicated by the arrows, and the polarity of the windings are designated by the dot notation which indicates that a storage condition of "0" will be induced if current enters a dotted terminal. Thus current flowing into the transfer loop at input lead 15 may be assumed to initially split through the two branch windings 16 and 18 thereby providing an equal and opposite flux which does not disturb the storage state of element 14. This condition occurs when element 12 resides in the "0" storage state such that current flowing into winding 20 does not tend to change the storage state of element 12. It may be assumed that core 14 is initially reset by some flux source to ordinarily reside in the storage state "0," and therefore current I causes in effect a transfer of the stored "0" from element 12 to element 14.

Conversely, however, if the element 12 resides in the storage state "1" current flow into winding 20 will cause the element 12 to switch into the "0" state. During this condition current flowing through the winding 16 of element 14 is impeded with respect to that flowing through winding 18 so that the larger current in the latter winding results in switching of element 14 into the "1" state thereby effecting a transfer of the stored "1" from element 12 to element 14.

Figure 4:
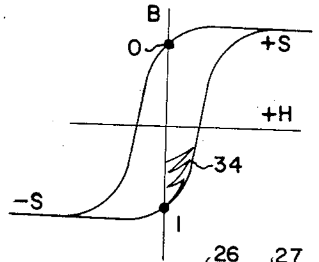
Fig. 4 is a hysteresis curve exhibited by materials which may be used as bistable elements without excessive noise transfer in accordance with principles of the present invention.
Figure 3:
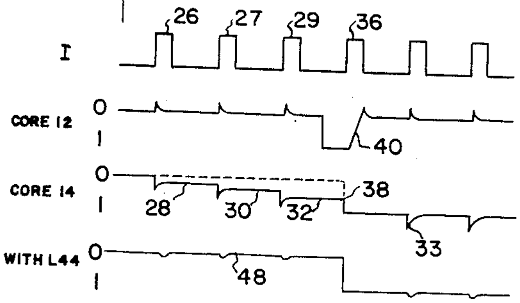
Fig. 3 is a waveform chart illustrating operational features of the invention.

The described action may be seen in connection with the waveforms of Fig. 3, wherein the transfer pulses I are indicated in connection with the two different states "0" and "1" which may be stored in element 12. It is seen that when the initial transfer pulse 26 occurs with the storage state "0" residing in element 12, the element 14 will receive a slight transient pulse 28 which will leave it in a partially switched storage state when a non-rectangular hysteresis characteristic is present in the storage element such as shown in Fig. 4. This is evident by considering the small change in induction B with a change in magnetic field +H. In practice it is difficult to obtain the ideal cores represented by the B–H plot of Fig. 1, and therefore the small amount of noise 28 with partial switching is usually present. Upon subsequent pulses 27 and 29 the small amount of noise induced in element 14 may tend to build up the partially switched storage to levels 30 or 32 because of the tendency of the remanence condition to start climbing up the hysteresis characteristic as shown by the curve 34 of Fig. 4. This is readily recognized as an undesirable feature, particularly where it is necessary to read information out of an element residing in the "0" state many times.

However, if the element 12 is in the "1" storage state it is seen that the initial transfer pulse 36 will cause element 14 to switch completely to the "1" storage state as shown at the transition 38. It will remain undisturbed in the "1" state thereafter until a flux unbalance in the +S direction occurs. During the transfer of formation to element 14 the element 12 is switched from the "1" state to the "0" state by current I, as indicated by the transition gradient 40. Thereafter any noise transfer causing the temporary surges 33 even if present would be ineffective in disturbing the level of the remanent storage state of element 14 since it merely tends to drive it into —S saturation and would have no tendency to cause the element to switch.

Figure 5:
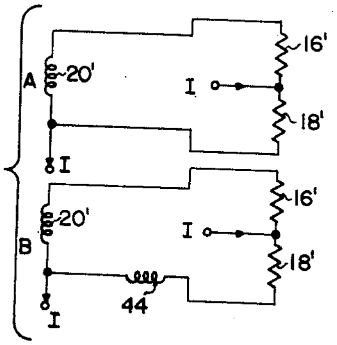
Figs. 5A and 5B are equivalent circuits of transfer loops coupling a pair of magnetic storage elements.

If the hysteresis characteristic of Fig. 4 is analyzed, it is seen that the noise impulse exists only during the initial flow of current into a winding on the transferror element, as it is going from the remanence state "0" to +S, after which there is no further change. Thus, winding 20 of Fig. 2 causes the current through winding 16 to be reduced with respect to the current through winding 18. Therefore, by placing a monostable state inductor 44, such as a small air core winding, to receive only the current flowing through the winding 18 of element 14, the current through winding 18 is similarly impeded so that current balance may be maintained. The inductor therefore effectively presents the same characteristics as the apparent inductance of element 12 due to the presence of the transfer current driving it from "0" storage into +S saturation. Thus, a balancing action is presented which prevents an unbalance of current in the two separate windings 16 and 18 of element 14 without switching action or the presence of current other than that normally flowing within the transfer circuit. Therefore, this means of reducing noise transfer between two magnetic storage elements is more efficient than prior art devices. A comparison of the switching action of curve 48 in Fig. 3 with the remaining curves in this figure illustrates the improvement available with the presence of the inductor 44. The equivalent circuits of Fig. 5 illustrate more simply the balancing action produced by the equal inductors 20′ and 44 of Fig. 5B as compared with the unbalanced circuit of Fig. 5A. In these equivalent circuits the windings 16 and 18 upon element 14 may be considered simply as resistors since any inductive component is cancelled out by the equal and opposite fluxes produced in the separate halves of the windings.

Figure 6:
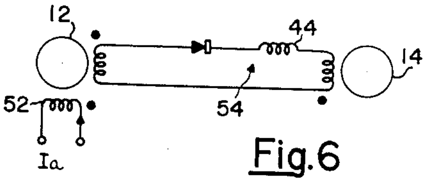
Figs. 6, 7 and 8 are schematic circuit diagrams of various embodiments of the invention.

In Fig. 6 the noise reducing inductor is illustrated in connection with a conventional single diode transfer loop. In this circuit when an advance current pulse $I_a$ is applied to winding 52, either a large transfer current or a small noise current flows in the transfer loop 54. Inductor 44 is inserted in the transfer loop for reducing the initial current flow surge through the loop. Thus, the noise surge is inhibited since the inductor resists a transient change, whereas the signal transfer which persists for a longer time will only be inhibited during the initial rise of current. This effect contributes to the reliability of transfer due to initial rounding of the transfer waveform in much the same manner as described in the Browne Patent 2,654,080. Thereby the inductor substantially improves the signal to noise ratio obtained during transfer of information. In this circuit, likewise, the decrease of noise transfer is obtained without the use of expensive bistable elements or non-linear inductors, and without the use of external current sources which impede the transfer of signal information as well as the noise. Since the reactive elements in the transfer loop only oppose the initial surge of current, they do not substantially hinder the transfer of normal large signal currents, even though they are very effective during the transfer of the noise pulses due to the initial surge of transfer currents. In addition rounded waveform transfer action is produced without the introduction of special transfer current sources.

Figure 7:
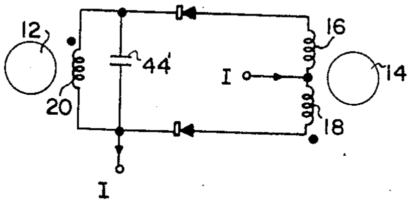

An alternative embodiment of the invention is shown in Fig. 7. In this embodiment a capacitor 44′ connected across winding 20 is used rather than the inductance 44 connected in series in the transfer circuit. This capacitor is used to substantially provide a short circuit across the winding 20 for the initial surge of current flow and thereby prevent the transfer of noise between elements 12 and 14 in much the same manner as hereinbefore described. Although resistive elements could be used in the circuit, they would represent power losses, and would also oppose the transfer of signal information between the elements rather than only the initial current surge. For this reason reactive circuit elements are preferred.

Figure 8:
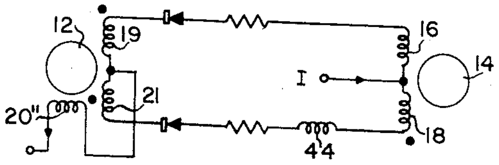

In Fig. 8 a further conditional transfer circuit is shown which requires the passage of a transfer current I through the transfer loop. In this embodiment the inductor 44 serves to balance out any noise transfer in the same manner as shown in Fig. 2, even though the transfer circuit comprises the separate balanced windings 19 and 21 at element 12 through which the transfer current flows. In order to provide the switching function in this type of circuit an additional switching winding 20″ is necessary, and transfer current I flowing therethrough from both branch current flows paths of both windings 19 and 21 is effective to cause the element 12 to switch. In this circuit, since the combined winding 19—21 has a noise signal induced of one polarity, the current flow will be aided in one of the two current paths and opposed in the other in the presence of noise signals. The inductor 44 serves to substantially reduce this effect in the manner heretofore described by opposing the unbalance of current during the initial surge.

The value of the reactive inductor 44 is not critical. If the inductor is too small, it serves to improve the operation to a lesser extent than otherwise possible. Conversely, if the inductor is too large it still serves the purpose of reducing noise but in that case may be inefficient by introducing a loss of signal during the transfer of information.

It is evident from the foregoing description of the invention that there is provided an efficient and simplified noise reduction circuit which greatly improves reliability of magnetic transfer circuits. It is possible by incorporation of the features of this invention to provide multiple readout of information in a reliable manner, and to couple magnetic elements in longer cascade coupled information transfer circuits such as multiple element shift registers than otherwise possible. Accordingly, those features which are believed descriptive of the invention are defined with particularity in the appended claims.

What is claimed is:

1. A magnetic transfer circuit comprising a transferror core having a substantially rectangular hysteresis loop characteristic, and a transferee core having a substantially rectangular hysteresis loop characteristic, a plurality of unidirectional current devices, and an air core inductance, said transferror core having an output winding thereon, said transferee core having a split input winding thereon, one side of said output winding connected to one side of said split input winding through one of said unidirectional current devices, the other side of said output winding being connected to the other side of said split input winding through another of said unidirectional current devices and said air core inductance, said air core inductance being substantially free from mutual inductive influence of both said input and said output windings, said unidirectional current devices being opposingly poled so as to prevent circulatory current through the loop formed thereby, and means for applying a transfer pulse connected between a midpoint of said split input winding and that side of said output winding connected through said air core inductance.

2. A magnetic transfer circuit comprising a transferror core of substantially rectangular hysteresis loop characteristic having a split output winding and a transfer winding thereon, one side of said transfer winding being connected to a midpoint of said split output winding, a transferee core of substantially rectangular hysteresis loop characteristic having a split input winding, a connection between one side of said split output winding and one side of said split input winding including a diode, a connection between the other side of said split output winding and the other side of said split input winding including a second diode and an air core inductance, said diodes being opposingly poled to prevent circulatory currents through the loop formed thereby, said air core inductance being substantially free from mutual inductive influence of both said output and said input windings, and a source of transfer pulses connected between the other side of said transfer winding and a midpoint of said split input windings.

3. In a binary storage system; a transferror core and and a transferee core, each being a magnetic core of high retentivity and each capable of assuming either of two stable states of magnetic remanence of opposite polarities, a state of one polarity being considered to represent a binary "0" and the other polarity a binary "1"; a read-out output winding coupled to said transferror core in which a relatively large voltage is induced when said transferror core switches from either of said states to the other and in which a relatively small voltage is induced when said core is driven from magnetic remanence of said one polarity to magnetic saturation of the same polarity; a read-in input winding coupled to said transferee core; a pair of diodes, one connected between one end of said read-out output winding and one end of said read-in input winding and the other connected between the other end of said read-out output winding and the other end of said read-in input winding, thereby to form two parallel paths between said output and input windings, whereby said windings and said parallel paths form a loop, said diodes being opposingly poled to inhibit circulatory current flow around said loop; transfer means for reading stored information out of said transferror core and into said transferee core, said transfer means comprising means for connecting one terminal of a source of pulse transfer current to a midpoint on said read-in input winding to drive transfer current through two sections of said input winding in opposing directions to create opposing magnetic forces in said transferee core, and connecting means including an additional read-out winding which is also coupled to said transferror core for coupling said other terminal of said source to a midpoint on said read-out output winding to drive transfer current through said read-out output winding in a direction to switch or to tend to switch said transferror core to said one polarity state; and an air-core inductance serially connected in that one of said parallel paths which includes a diode which tends to be forward biased by the small voltage induced in said read-out output winding when said transferror core is driven from magnetic remanence of said one polarity to magnetic saturation of the same polarity, said air-core inductance being of such value that the voltage induced therein by the pulse of transfer current is substantially equal to and opposes that induced in said read-out output winding when said core does not change state in response to said pulse of transfer current, whereby the transfer currents through said two sections of said read-in input winding create opposing magnetic forces in said transferee core of substantially equal magnitude, whereby read-in of a noise signal into said transferee core is prevented when said transferror core is already in said one state at the time said pulse of transfer current is applied.

References Cited in the file of this patent

UNITED STATES PATENTS

| | | |
|---|---|---|
| 2,652,501 | Wilson | Sept. 15, 1953 |
| 2,681,181 | Spencer | June 15, 1954 |
| 2,734,182 | Rajchman | Feb. 7, 1956 |
| 2,741,758 | Cray | Apr. 10, 1956 |
| 2,857,586 | Wylen | Oct. 21, 1958 |

OTHER REFERENCES

"Magnetic Shift Register Using One Core Per Bit," by Ruhman and Woo, 1953 IRE Convention Record, March, 23–26 (pp. 38–41).